United States Patent
Löhr et al.

(10) Patent No.: US 8,576,784 B2
(45) Date of Patent: Nov. 5, 2013

(54) UPLINK RESOURCE ALLOCATION IN A MOBILE COMMUNICATION SYSTEM

(75) Inventors: Joachim Löhr, Langen (DE); Eiko Seidel, Langen (DE)

(73) Assignee: Panasonic Corporation, Osaka (JP)

(*) Notice: Subject to any disclaimer, the term of this patent is extended or adjusted under 35 U.S.C. 154(b) by 661 days.

(21) Appl. No.: 12/162,592

(22) PCT Filed: Nov. 2, 2006

(86) PCT No.: PCT/EP2006/010521
§ 371 (c)(1),
(2), (4) Date: Oct. 2, 2008

(87) PCT Pub. No.: WO2007/087842
PCT Pub. Date: Aug. 9, 2007

(65) Prior Publication Data
US 2009/0116434 A1    May 7, 2009

(30) Foreign Application Priority Data

Feb. 3, 2006    (EP) .................................. 06002248

(51) Int. Cl.
    *H04W 4/00*    (2009.01)
(52) U.S. Cl.
    USPC ........................................................ 370/329
(58) Field of Classification Search
    None
    See application file for complete search history.

(56) References Cited

U.S. PATENT DOCUMENTS

| 6,804,219 | B2* | 10/2004 | Koo et al. | 370/335 |
| 2002/0142749 | A1 | 10/2002 | Muniere | |
| 2005/0063330 | A1* | 3/2005 | Lee et al. | 370/328 |
| 2005/0070292 | A1* | 3/2005 | Liu | 455/450 |
| 2005/0135324 | A1* | 6/2005 | Kim et al. | 370/343 |
| 2006/0203712 | A1* | 9/2006 | Lim et al. | 370/208 |
| 2007/0091787 | A1* | 4/2007 | Kwon et al. | 370/208 |
| 2007/0133458 | A1* | 6/2007 | Chandra et al. | 370/329 |

FOREIGN PATENT DOCUMENTS

| EP | 1 954 081 | 8/2008 |
| WO | 2007/052752 | 5/2007 |

OTHER PUBLICATIONS

International Search Report dated May 23, 2007.
3GPP TS 44.018 version 6.12.0 Release 6, "Digital cellular telecommunications system (Phase 2+); Mobile radio interface layer 3 specification; Radio Resource Control (RRC) protocol; ETSI TS 144 018," ETSI Standards, European Telecommunications Standards Institute, Sophia -ANTIPO, FR, vol. 3-G2, No. V6120, Apr. 2005, XP014028318.
Japanese Office Action dated Jan. 24, 2012 with translation.

* cited by examiner

*Primary Examiner* — Anh-Vu Ly
(74) *Attorney, Agent, or Firm* — Dickinson Wright PLLC

(57) ABSTRACT

The present invention relates to a method and mobile terminal for requesting resources for transmitting data on uplink within a mobile communication system. Further the invention relates to a network entity for allocating uplink resources to mobile terminal. To provide a flexible scheduling scheme for uplink transmission, the invention proposes different scheduling procedures based on a request grant scheme. The resource request of the mobile terminal is provided via a contention-based channel, while all further communication uses scheduled resources. Consequently subsequent transmissions of user data and/or scheduling information utilize scheduled resources.

54 Claims, 6 Drawing Sheets

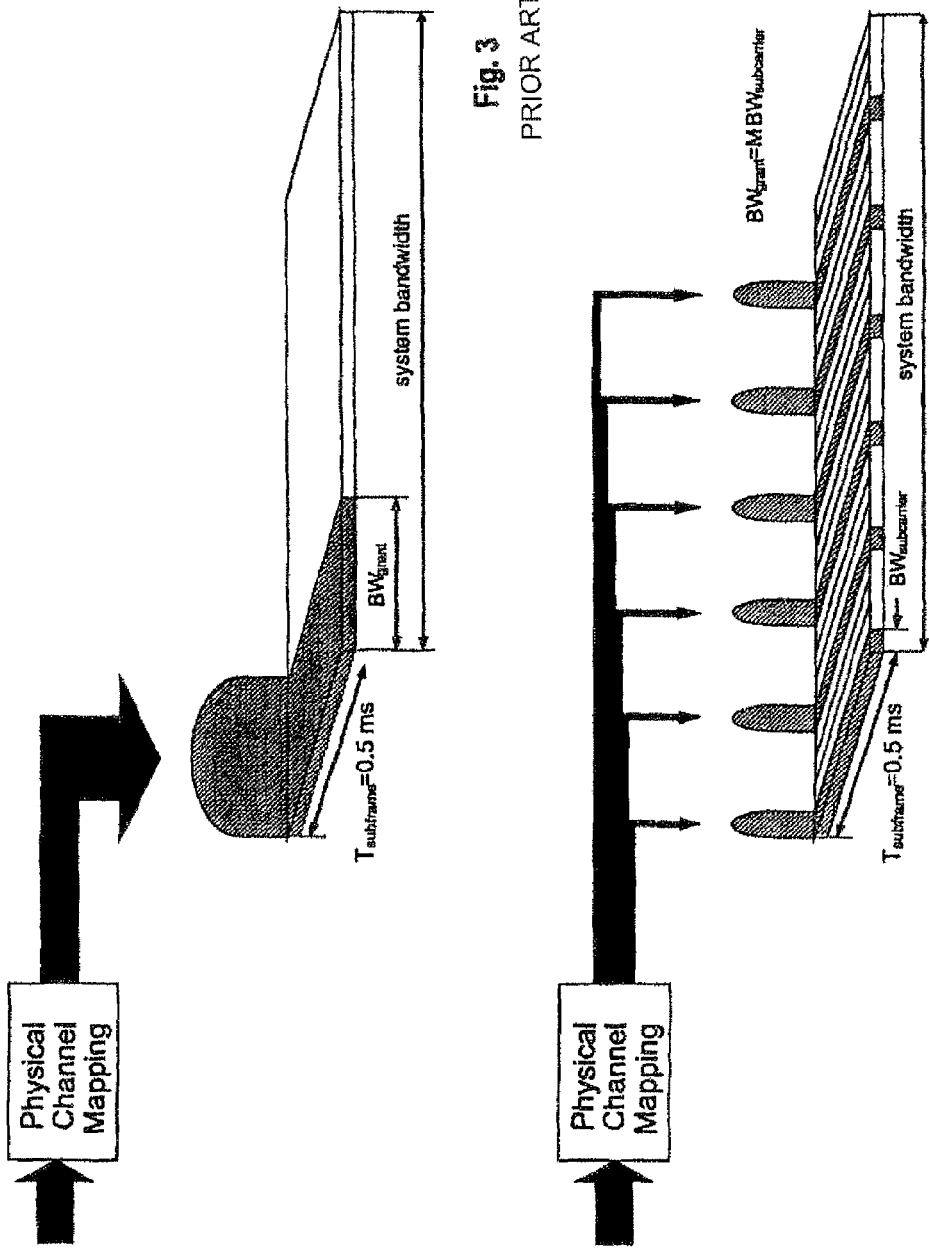

UPLINK RESOURCE ALLOCATION IN A MOBILE COMMUNICATION SYSTEM

FIELD OF THE INVENTION

The present invention relates to a method and mobile terminal for requesting resources for transmitting data on uplink within a mobile communication system. Further the invention relates to a network entity for allocating uplink resources to mobile terminal.

TECHNICAL BACKGROUND

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

However, knowing that user and operator requirements and expectations will continue to evolve, the 3GPP has begun considering the next major step or evolution of the 3G standard to ensure the long-term competitiveness of 3G. The 3GPP recently launched a study item "Evolved UTRA and UTRAN". The study will investigate means of achieving major leaps in performance in order to improve service provisioning and reduce user and operator costs. It is generally assumed that there will be a convergence toward the use of Internet Protocols (IP), and all future services will be carried on top of IP. Therefore, the focus of the evolution is on enhancements to the packet-switched (PS) domain.

The main objectives of the evolution are to further improve service provisioning and reduce user and operator costs as already mentioned. More specifically, some key performance and capability targets for the long-term evolution (LTE) are inter alia:

- significantly higher data rates compared, to HSDPA and HSUPA (envisioned are target peak data rates of more than 100 Mbps over the downlink and 50 Mbps over the uplink)
- high data rates with wide-area coverage
- significantly reduced latency in the user plane in the interest of improving the performance of higher layer protocols (for example, TCP) as well as reducing the delay associated with control plane procedures (for instance, session setup), and
- threefold system capacity compared to current standards.

One other key requirement of the long-term evolution is to allow for a smooth migration to these technologies.

Uplink Access Scheme for LTE

For uplink transmission, power-efficient user-terminal transmission is necessary to maximize coverage. Single carrier transmission combined with FDMA and dynamic bandwidth allocation has been chosen as the evolved UTRA uplink transmission scheme. The main reason for the preference for single-carrier transmission is the lower peak-to-average power ratio (PAPR) compared to multi-carrier signals (such as OFDMA), the corresponding improved power-amplifier efficiency and assumed improved coverage (higher data rates for a given terminal peak power). In each time interval, Node B assigns users a unique time/frequency resource for transmitting user data thereby ensuring intra-ell orthogonality. An orthogonal access in the uplink promises increased spectral efficiency by eliminating intra/cell interference. Interference due to multipath propagation is handled at the base station (Node B), aided by insertion of a cyclic prefix in the transmitted signal.

The basic physical resource used for data transmission consists of a frequency resource of size $BW_{grant}$ during one transmission time interval, e.g. a sub-frame of 0.5 ms, onto which coded information bits are mapped. It should be noted that a sub-frame, also referred to as transmission time interval (TTI), is the smallest time interval for user data transmission. It is however possible to assign a frequency resource $BW_{grant}$ over a longer time period than one TTI to a user by concatenation of sub-frames.

The frequency resource can either be in a localized or distributed spectrum as illustrated in FIG. 3 and FIG. 4. As can be seen in FIG. 3, localized single-carrier is characterized by the transmitted signal having a continuous spectrum that occupies a part of the total available spectrum. Different symbol rates (corresponding to different data rates) of the transmitted signal imply different bandwidths of a localized single-carrier signal.

On the other hand, as can be seen in FIG. 4, distributed single-carrier is characterized by the transmitted signal having a non-continuous ("comb-shaped") spectrum that is distributed over system bandwidth. Note that, although the distributed single-carrier signal is distributed over the system bandwidth, the total amount of occupied spectrum is, in essence, the same as that of localized single-carrier. Furthermore, for higher/lower symbol rate, the number of "comb-fingers" is increased/reduced, while the "bandwidth" of each "comb finger" remains the same.

At first glance, the spectrum shown in FIG. 4 may give the impression of a multi-carrier signal where each comb-finger corresponds to a "sub-carrier". However, from the time-domain signal-generation of a distributed single-carrier signal, it should be clear that what is being generated is a true single-carrier signal with a corresponding low peak-to-average power ratio.

The key difference between a distributed single-carrier signal vs. a multi-carrier signal, such as e.g. OFDM, is that, in the former case, each "sub-carrier" or "comb finger" does not carry a single modulation symbol. Instead each "comb-finger" carries information about all modulation symbol. This creates a dependency between the different comb-fingers that leads to the low-PAPR characteristics. It is the same dependency between the "comb fingers" that leads to a need for equalization unless the channel is frequency-non-selective over the entire transmission bandwidth. In contrast, for OFDM equalization is not needed as long as the channel is frequency-non-selective over the sub-carrier bandwidth.

Distributed transmission can provide a larger frequency diversity gain than localized transmission, while localized transmission more easily allows for channel-dependent scheduling. Note that, in many cases the scheduling decision may decide to give the whole bandwidth to a single UE to achieve high data rates.

Uplink Scheduling Scheme

The uplink scheme should allow for both scheduled (Node B controlled) access and contention-based access. In case of scheduled access the UE is dynamically allocated a certain frequency resource for a certain time (i.e. a time/frequency resource) for uplink data transmission.

Some time/frequency resources can be allocated for contention-based access. Within these time/frequency resources, UEs can transmit without first being scheduled.

For the scheduled access Node B scheduler assigns a user a unique frequency/time resource for uplink data transmission. For example, the scheduler determines a which UE(s) is (are) allowed to transmit, which physical channel resources (frequency), for how long the resources may be used (number of subframes)

Transport format (e.g. Modulation Coding Scheme (MCS)) to be used by the mobile terminal for transmission The allocation information is signaled to the UE via a scheduling grant sent on the downlink control channel. In LTE, for simplicity this channel is also referred to as LTE_H-S_SCCH (Long Term Evolution—High Speed—Shared Control CHannel). A scheduling grant message contains at least information on which part of the frequency band the UE is allowed to use, whether localized or distributed spectrum should be used, the validity period of the grant, and the maximum data rate. The shortest validity period is one subframe. Additional information may also be included in the grant message, depending on the selected scheme.

Uplink data transmissions are only allowed to use the time-frequency resources assigned to the UE through the scheduling grant. If the UE does not have a valid grant, it is not allowed to transmit any uplink data. Unlike in HSUPA, where each UE is always allocated a dedicated channel there is only one uplink data channel shared by multiple users (UL SCH—UpLink Shared CHannel) for data transmissions. Furthermore, there is only one mode of operation for the uplink data access in LTE, the above described scheduled access, i.e. unlike in HSUPA where both scheduled and autonomous transmissions are possible.

To request resources, the UE transmits a resource request message to the Node B. This resources request message could for example contain information on the amount of data to transmit, the power status of the UE and some Quality of Services (QoS) related information. This information, which will be referred to as scheduling information, allows Node B to make an appropriate resource allocation.

Resource requests are transmitted using the contention-based access compared to the above described scheduled access. However, if the UE already has a valid grant, e.g., if a data transmission is ongoing, the resource requests updates can be transmitted using the granted resources, e.g., as part of MAC headers or MAC control PDU. Contention-based access can be seen as a special case of the normal scheduled access, where Node B assigns a physical resource to one user. In case of contention-based access a physical resource (sub-carriers) is assigned/shared to multiple UEs for uplink transmission. The allocation for the contention-based channel, also referred to as random access channel, is for example signaled on a broadcast channel, so that all UEs in a ell have access to this area.

FIG. 5 illustrates an exemplary allocation for contention-based access. The bandwidth of the random access channel may for example depend on the estimated number of simultaneous accessing users and on the size of the messages transmitted on the channel. In the depicted example, the random access channel is allocated in a TDM fashion, one out of X subframes forming a frame is reserved for contention-based access over the entire frequency band. However it's also possible to allocate only part of the total bandwidth for random access in a distributed spectrum, in order to benefit further from frequency diversity.

Since the access is not scheduled, there is a probability, that multiple UEs access the random access channel simultaneously, leading to collisions. UE-specific scrambling and processing gain can be used in order to separate the various transmissions. The contention-based access should be only used for requesting resources in case UE has no valid grant assigned or for the initial access (going from idle to connected mode).

Channel-dependent scheduling should be also supported by the uplink-scheduling scheme in LTE. However, since there is no transmission from non-scheduled UEs, it's not straightforward.

The scheduler, typically located in the Node B for LTE, needs to know the users uplink channel status before allocating resources by means of a channel-dependent scheduling algorithm. Therefore UE may transmit pilot bits, which are known at the receiver side, prior to the data transmission to support channel-dependent scheduling. Node B can consider the measured C/I ratio (Carrier-to-Interference ratio) of the pilots bits for the resource allocation.

Scheduling Related Control Signaling

The Node B controlled scheduled access is based on uplink and downlink control signaling together with a specified UE behavior with respect to the control signaling.

In the downlink a resource allocation message is transmitted from Node B to the UE indicating the physical resources (time/frequency resource) assigned to this user. As already mentioned above this allocation message, also referred to as scheduling grant, contains information on the identification of the user the resource allocation is addressed to, the reserved physical resource (time/frequency resource), some information on the maximum data rate, modulation and coding scheme and also probably some HARQ related information (redundancy version).

In the uplink UE sends a scheduling request to the Node B when data for uplink transmission is available in the buffer. The scheduling request message contains information on the UE status, e.g. buffer status, QoS related information, power headroom information. This in turn allows Node B to make an appropriate allocation of resources considering also QoS requirements of the data to be transmitted.

In parallel to the actual uplink data transmission, UE signals data related control signaling, providing information on the current data transmission similar to the E-DPCCH signaling in UMTS Release 6 (HSUPA). This control signaling contains information on the chosen transport format (TFCI), which is used for decoding the data transmission at Node B, and some HARQ related information, e.g. Redundancy version, HARQ process ID and NDI (New Data Indicator). The exact information depends obviously on the adopted HARQ protocol. For example in a synchronous HARQ protocol there is no need to signal the HARQ process ID explicitly.

Uplink Timing

To ensure orthogonality in the uplink, all UE transmissions must be time aligned at the Node B within the cyclic prefix. This is implemented by the Node B measuring the timing accuracy in a received signal and, based on the timing accuracy, transmitting a timing adjustment command to the UE. The timing adjustment command is sent as control information using the downlink SCCH. Note that a UE not actively transmitting may be out-of-sync, which needs to be accounted for in the initial random access. This timing control information commands UE to advance or retract the respective transmit timing. Two alternatives for the timing control commands are currently considered:

Binary timing-control commands implying forward/backward of the transmit timing a certain step size x µs [x TBD] transmitted with a certain period y µs [y TBD].

Multi-step timing-control commands being transmitted on the downlink on a per-need basis.

As long as a UE carries out uplink data transmission, the received signal can be used by Node B to estimate the uplink receive timing and thus as a source for the timing-control commands. When there is no data available for uplink, the UE may carry out regular uplink transmissions (uplink synchronization signals) with a certain period, to continue to enable uplink receive-timing estimation and thus retain uplink time alignment. In this way, the UE can immediately restart uplink-orthogonal data transmission without the need for a timing re-alignment phase.

If the UE does not have uplink data to transmit for a longer period, no uplink transmission should be carried out. In that case, uplink time alignment may be lost and restart of data transmission must then be preceded by an explicit timing-re-alignment phase to restore the uplink time alignment.

Efficient scheduling in an orthogonal uplink radio access requires Node B to rapidly allocate resources, e.g. frequency/time symbols, among UEs having data for transmission thereby meeting the QoS requirements of the corresponding data. Another demand on the scheduling scheme is the support of channel-dependent scheduling in order to further improve the efficiency, e.g. system throughput. Hence, a mechanism is required for UE to request resources.

This resource request message transmitted by the UEs to request uplink resources typically contains very detailed information on the UE status, e.g. buffer status, QoS parameter and power headroom within its scheduling information. The scheduling information needs to be very precise in LTE UL in order to enable Node B to make an exact and efficient resource allocation. Therefore the message size is supposed to be much longer compared to HSUPA, where Scheduling Information only comprised 18 bits. Since UE hasn't been assigned any resources at the first step, scheduling information is sent on a contention-based access channel.

As indicated above, the scheduling information is sent on a contention-based access to the scheduler. As a consequence in order to keep the collision probability at a sufficient low level, the contention-based channel will consume a relatively large amount of resources. This may lead to an inefficient usage of the uplink resources, e.g. less bandwidth can be spent for the scheduled access. Since the size of the scheduling information message is rather long collisions may lead to an increased delay in transmission of the scheduling information, which will hence delay the whole scheduling procedure. Short message sizes are in general preferable in a contention-based access. In case the transport block size for a message transmitted on a contention-based access is fixed, the error-protection could be increased for smaller message sizes, e.g. more redundancy bits within the transport block. When transport block size depends on the message size, e.g. coding rate is fixed, the collision probability is smaller in case of smaller transport block sizes.

Another drawback of conventional scheduling schemes may be that reference signals, required for the support of channel-dependent scheduling, are only transmitted once. However the channel may change significantly for one user within the time instance of sending the reference signals and the actual resource allocation for this user. Node B could for example schedule other user, which may have a higher priority or better channel conditions, before assigning resources to this user. Therefore the channel information may not be up-to-date, which would lead to an inappropriate MCS selection.

SUMMARY OF THE INVENTION

The object of the invention is to propose a flexible scheduling scheme. Another object is to propose a flexible scheduling scheme that allows overcoming at least one of the problems outlined above.

The object is solved by the subject matter of the independent claims. Advantageous embodiments of the invention are subject matters to the dependent claims.

According to an embodiment of the invention, a method for requesting resources for transmitting data on uplink within a mobile communication system is provided. On the uplink an uplink scheme comprising transmissions on a scheduled shared channel and a contention-based channel may be utilized. The mobile terminal may transmit a resource request to a network entity responsible for resource allocation via a contention-based channel, and may receive in response thereto a resource allocation message granting resources for transmitting data via the scheduled shared channel.

In another embodiment of the invention the resource allocation message received in response to the resource request grants resources for transmitting scheduling information to the network entity responsible for resource allocation. The mobile terminal may transmit scheduling information to the network entity responsible for resource allocation via the scheduled shared channel in response to the resource allocation message. In response to the transmission of scheduling information the mobile station may receive a second resource allocation message granting resources to the mobile terminal for transmitting user data on the scheduled shared channel.

Optionally, the resource allocation message received in response to the resource request indicates resources granted to the mobile terminal for transmitting a reference signal.

In this case, according to another embodiment of the invention, the mobile station may repeatedly transmit a reference signal to the network entity responsible for resource allocation upon having received the resource allocation message in response to the resource request.

In an advantageous variation, the mobile terminal utilizes the resources granted for the scheduled shared channel as indicated in the resource allocation message received in response to the resource request for repeatedly transmitting the reference signal.

In another advantageous variation of this embodiment, the resource allocation message received in response to the resource request indicates resources granted to the mobile terminal for repeatedly transmitting the reference signal and the mobile terminal utilizes the resources granted for repeatedly transmitting the reference signal to repeatedly transmitting the reference signal.

A further variation of the embodiment foresees that the frequency of the transmission of the reference signal is configured by control signaling received from the radio access network of the mobile communication system, or is controlled by the mobile terminal.

In another advantageous variation of the embodiment, the mobile terminal may stop transmitting the reference signal upon having received the second resource allocation message granting resources to the mobile terminal for transmitting user data on the scheduled shared channel in response to the transmission of scheduling information.

According to a further embodiment of the invention the mobile terminal may receive in response to the resource request, a timing adjustment command from the network entity responsible for resource allocation, and may realign uplink timing according to the timing adjustment command prior to transmitting the scheduling information on the scheduled shared channel.

The timing adjustment command may be for example (but not limited thereto) comprised in the resource allocation message received in response to the resource request.

In a further embodiment of the invention a single carrier FDMA scheme is used to transmit data on the uplink. In this case, the contention-based channel may for example be mapped to a distributed spectrum on the uplink access.

In a further embodiment a single carrier FDMA scheme is used to transmit data on the uplink and the bandwidth utilized for transmitting resource request on the uplink access is proportional to the priority of the data for which resources for transmission is requested.

Optionally, the bandwidth the mobile terminal is allowed to utilize for transmitting a resource request is configured by control signaling received from the radio access network of the mobile communication system.

In another variation of this embodiment the mobile terminal may determine the bandwidth to utilize for transmitting the resource request based on the priority of the data for which resource allocation is requested.

According to a further embodiment of the invention the resources for transmitting data on the scheduled shared channel are granted on a transmission time interval basis. Accordingly, a resource allocation message may indicate the at least one transmission time interval or the number of transmission time intervals for which the resource allocation message grants resources.

Another embodiment of the invention relates to a method for allocating resources to a mobile terminal for transmitting data on uplink within a mobile communication system. As in the embodiments before, an uplink scheme comprising transmissions on a scheduled shared channel and a contention-based channel is used on the uplink. A network entity responsible for resource allocation of the mobile communication system may receive a resource request from the mobile terminal via a contention-based channel, and may transmit in response thereto a resource allocation message granting resources for transmitting data via the scheduled shared channel to the mobile terminal.

In a further embodiment of the invention the resource allocation message transmitted in response to the resource request grants resources for transmitting scheduling information to the network entity responsible for resource allocation. The network entity may further receive scheduling information from the mobile station via the scheduled shared channel, and may transmit, in response to the reception of the scheduling information, a second resource allocation message granting resources to the mobile terminal for transmitting user data on the scheduled shared channel.

In another embodiment of the invention the resource allocation message transmitted in response to the resource request indicates resources granted to the mobile terminal for transmitting a reference signal.

The network entity may repeatedly receiving a reference signal from the mobile terminal upon having transmitted the resource allocation message in response to the resource request according to another embodiment of the invention. The network entity may estimate the uplink channel quality of the shared scheduled channel based on the received reference signals.

In another embodiment of the invention the network entity responsible for resource allocation may further transmit a timing adjustment command to the mobile station in response to the resource request.

In a variation of the embodiment, the timing adjustment command may be comprised in the resource allocation message transmitted to the mobile terminal in response to the resource request.

As indicated above, a further embodiment of the invention foresees to use a single carrier FDMA scheme for transmitting data on the uplink. In this case, the contention-based channel may for example be mapped to a distributed spectrum on the uplink access.

According to another embodiment of the invention network entity responsible for resource allocation grants the resources for transmitting data on the scheduled shared channel on a transmission time interval basis. In a variation of the embodiment, a resource allocation message indicates the at least one transmission time interval or the number of transmission time intervals for which the resource allocation message grants resources.

In a further embodiment of the invention, the resource request received from the mobile terminal does not comprise scheduling information.

According to another embodiment of the invention the resource request may comprise an implicit or explicit identification of the requesting mobile terminal.

Moreover, according to another embodiment of the invention the resource request comprises a flag indicating to the network entity responsible for resource allocation that the mobile terminal requests the allocation of resources for data transmission. In a variation of this embodiment the mobile terminal may scramble the request message with a user-specific scrambling code prior to its transmission.

Another alternative embodiment foresees that the resource request comprises an identifier of the mobile terminal indicating to the network entity responsible for resource allocation that the mobile terminal requests the allocation of resources for data transmission.

In another alternative embodiment of the invention the resource request comprises resource information indicating the uplink resources required by the mobile terminal for transmitting user data.

In a variation of the embodiment, the resource information may comprise a flow identifier of the data flow of which the mobile terminal intends to transmit user data or the number of bits the mobile terminal intends to transmit.

Alternatively, the resource information may also consist of a flag indicating to the network entity responsible for resource allocation, when set, that the mobile terminal intends to transmit data of a delay-critical service.

A further embodiment of the invention provides a mobile terminal for use in a mobile communication system utilizing an uplink scheme comprising transmissions on a scheduled shared channel and a contention-based channel. The mobile terminal comprises a transmitter for transmitting a resource request to a network entity responsible for resource allocation via a contention-based channel, and a receiver for receiving, in response to the resource request, a resource allocation message granting resources for transmitting data via the scheduled shared channel.

In an advantageous embodiment of the invention, the resource allocation message received in response to the resource request grants resources for transmitting scheduling information to the network entity responsible for resource allocation. The transmitter may be further configured to transmit, in response to the resource allocation message, scheduling information to the network entity responsible for resource allocation via the scheduled shared channel, and the receiver may receive, in response to the transmission of scheduling information, a second resource allocation message granting resources to the mobile terminal for transmitting user data on the scheduled shared channel.

In another embodiment of the invention the mobile station may further comprise means adapted to perform the method for requesting resources for transmitting data on uplink within a mobile communication system according to one of the various embodiments outlined herein.

A further embodiment of the invention relates to a network entity responsible for resource allocation. The network entity may be located in a mobile communication system utilizing an uplink scheme comprising transmissions on a scheduled shared channel and a contention-based channel. According to the embodiment the network entity comprises a receiver for receiving a resource request from the mobile terminal via a contention-based channel, and a transmitter for transmitting, in response to the resource request, a resource allocation message granting resources for transmitting data via the scheduled shared channel to the mobile terminal.

In another embodiment of the invention the resource allocation message received in response to the resource request grants resources for transmitting scheduling information to the network entity responsible for resource allocation. The receiver of the network entity may be further configured to receive scheduling information from the mobile station via the scheduled shared channel, and the transmitter may be further configured to transmit, in response to the reception of the scheduling information, a second resource allocation message granting resources to the mobile terminal for transmitting user data on the scheduled shared channel to the network entity responsible for resource allocation.

In a further embodiment the network entity may comprise means configured to implement the steps of the method for allocating resources to a mobile terminal for transmitting data on uplink within a mobile communication system according to one of the various embodiments described herein.

According to another embodiment a computer-readable medium is provided that stores instructions that, when executed by a processor of a mobile terminal, cause the mobile terminal to request resources for transmitting data on uplink within a mobile communication system utilizing an uplink scheme comprising transmissions on a scheduled shared channel and a contention-based channel. The mobile terminal may be caused to request resources by transmitting a resource request to a network entity responsible for resource allocation via a contention-based channel, and receiving, in response to the resource request, a resource allocation message granting resources for transmitting data via the scheduled shared channel.

In another embodiment of the invention the resource allocation message received in response to the resource request grants resources for transmitting scheduling information to the network entity responsible for resource allocation and the computer-readable medium further stores instructions that, when executed by the processor of the mobile terminal, cause the mobile terminal to transmit, in response to the resource allocation message, scheduling information to the network entity responsible for resource allocation via the scheduled shared channel, and to receive, in response to the transmission of scheduling information, a second resource allocation message granting resources to the mobile terminal for transmitting user data on the scheduled shared channel.

In a further embodiment the computer-readable medium further stores instructions that, when executed by the processor of the mobile terminal, cause the mobile terminal to execute the method for requesting resources for transmitting data on uplink within a mobile communication system according to one of the various embodiments outlined herein.

A computer-readable medium according to a further embodiment of the invention stores instructions that, when executed by a processor of a network entity responsible for resource allocation, cause the network entity responsible for resource allocation to allocate resources to a mobile terminal for transmitting data on uplink within a mobile communication system utilizing an uplink scheme comprising transmissions on a scheduled shared channel and a contention-based channel. The network entity may be caused to allocate resources to the mobile terminal to by receiving a resource request from the mobile terminal via a contention-based channel, and by transmitting, in response to the resource request, a resource allocation message granting resources for transmitting data via the scheduled shared channel to the mobile terminal.

In another embodiment of the invention the resource allocation message received in response to the resource request grants resources for transmitting scheduling information to the network entity responsible for resource allocation and the computer-readable medium further stores instructions that, when executed by the processor of the network entity responsible for resource allocation, cause the network entity responsible for resource allocation to receive scheduling information from the mobile station via the scheduled shared channel, and to transmit, in response to the reception of the scheduling information, a second resource allocation message granting resources to the mobile terminal for transmitting user data on the scheduled shared channel to the network entity responsible for resource allocation.

The computer-readable medium according to another embodiment of the invention stores instructions that, when executed by the processor of the network entity cause the network entity responsible for resource allocation to execute the method for allocating resources to a mobile terminal for transmitting data on uplink within a mobile communication system according to one of the various embodiments described herein

BRIEF DESCRIPTION OF THE FIGURES

In the following the invention is described in more detail in reference to the attached figures and drawings. Similar or corresponding details in the figures are marked with the same reference numerals.

FIGS. 3 and 4 show an exemplary localized allocation and distributed allocation of the uplink bandwidth in a single carrier FDMA scheme.

DETAILED DESCRIPTION OF THE INVENTION

Figure 1:
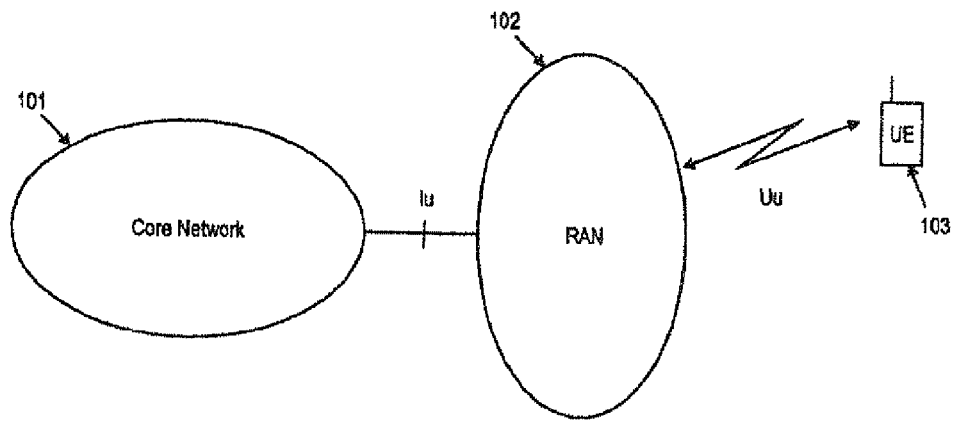
FIGS. 1 and 2 show two exemplary network architectures, in which the invention may be utilized.

The present invention suggests a flexible scheduling scheme for allocating resources for uplink transmission to a requesting mobile terminal. According to one embodiment of the invention, the mobile terminal requests the allocation of resources by sending a resource request to a network entity in the mobile communication system responsible for resource allocation. This request is transmitted on a contention-based channel.

The network entity may respond to this resource request in different fashions. For example, depending on the content of the resource request, the network entity may allocate resources for uplink data transmission to the requesting mobile terminal or, alternatively, may first allocate resources to the mobile terminal to allow same sending scheduling information. This scheduling information may for example allow the network entity to more accurately schedule resources for the mobile terminal. In the latter case, the mobile terminal will send the further information to the network entity as scheduled data, i.e. on a scheduled shared channel. In response to the further information, the mobile terminal will receive a resource allocation message granting resources for uplink user data transmission.

It should be noted that scheduling information is not considered user data herein. User data may be any type of data of a user service or signaling radio bearer.

In one exemplary embodiment of the invention, user data may be defined as data of services not being terminated in Layer 2/MAC or Layer 1/physical layer. In another embodiment of the invention, user data may be defined as data of services not being terminated in Layer 1/physical layer. Hence, in these two exemplary embodiments, user data is data of any service terminated in a higher layer than Layer 2/MAC or Layer 1/physical layer, respectively.

According to this invention, a resource request is a message transmitted from a mobile terminal to the network entity responsible for resource allocation, i.e. a network element that is responsible for scheduling air interface resources. The resource request may be a single bit (flag) that, when set, indicates the mobile terminal's desire to be allocated resources for uplink transmission. However, also more information may be comprised in the resource request depending on the scheduling scheme as will become apparent from the exemplary embodiments of the Invention described below.

According to one exemplary embodiment of the invention, a resource request message is a Layer 2/MAC signaling message or a Layer 1/physical layer message.

According to the invention, a resource allocation message contains at least information indicating which resources the requesting mobile terminal may utilize for scheduled uplink transmission.

For example, the resource allocation message may indicate which part of the frequency band the requesting mobile terminal is allowed to use. In more specific examples, the resource allocation message may further specify whether localized or distributed spectrum should be used, the validity period of the grant, and/or the maximum data rate. The validity period indicates for how many subframes the resource allocation is valid. The shortest validity period is one subframe (or one transmission time interval).

Additional information may also be included in the resource allocation message, depending on the selected scheme. The resource allocation message may also be referred to as a scheduling grant.

In one embodiment the invention is used in a mobile communication system in which single carrier FDMA is used on the air interface for uplink transmission. In this exemplary embodiment, the basic physical resource used for data transmission consists of a frequency resource of size $BW_{grant}$ during one transmission time interval, e.g. a sub-frame, onto which (optionally coded) user data bits are mapped. It should be noted that a sub-frame, also referred to as transmission time interval (TTI), is the smallest time interval for user data transmission. It is however possible to assign a frequency resource $BW_{grant}$ over a longer time period than one TTI to a user by concatenation of sub-frames. In this respect, FIG. 3 and FIG. 4 illustrate an exemplary allocation of uplink resources to a mobile terminal within a single carrier FDMA system.

A scheduled shared channel according to the invention is—for example—either a shared transport channel, which is shared by a plurality of users, or the corresponding physical channel to which a shared transport channel is mapped.

In an exemplary embodiment related to the evolved UTRA uplink, there exists only a shared uplink transport channel (UL-SCH) and a Random Access Channel (RACH). Transmission on a scheduled shared channel in this embodiment means that a user is assigned a specific frequency/time resource for the transmission of uplink data. The assignment is done by a scheduler that schedules/allocates the bandwidth available for scheduled access (e.g. scheduled resources as shown in FIG. 12) among the users under its control. A contention-based channel according to this embodiment denotes either the Random Access Channel (RACH), which is a transport channel, or the corresponding physical channel. Transmission on a contention-based channel means that a user can transmit data on the contention-based resources (as exemplarily depicted in FIG. 12) without being scheduled.

Before discussing the different embodiments of the invention in more detail, exemplary network architectures in which the invention may be employed will be briefly described in the following. It should be noted that the two network architectures are merely intended to give examples of networks in which the invention may be used and are not intended to limit the invention to the use in these networks.

One exemplary mobile communication network in which the invention in its different embodiments may be implemented is depicted in FIG. 1. The network comprises different network entities that are functionally grouped into the Core Network (CN) 101, the Radio Access Network (RAN) 102 and the User Equipments (UEs) 103 or mobile terminals. The RAN 102 is responsible for handling all radio-related functionality inter alia including scheduling of radio resources. The CN 101 may be responsible for routing calls and data connections to external networks. The interconnections of network elements are defined by open interfaces that are denoted Iu and Uu for exemplary purposes. A mobile communication system is typically modular and it is therefore possible to have several network entities of the same type.

In this exemplary network illustrated in FIG. 1, the radio access network may comprise one or more network entities responsible for resource allocation. Assuming that FIG. 1 shows a high-level architecture of 3G networks, a network entity responsible for resource allocation is commonly referred to as the radio network controller (RNC) which schedules air interface resources within the cells of the Node Bs attached to the RNC. Alternatively, other implementations may also foresee to utilize other RAN entities, such as the base stations (NodeBs) to schedule/allocate air interface resources.

Figure 2:
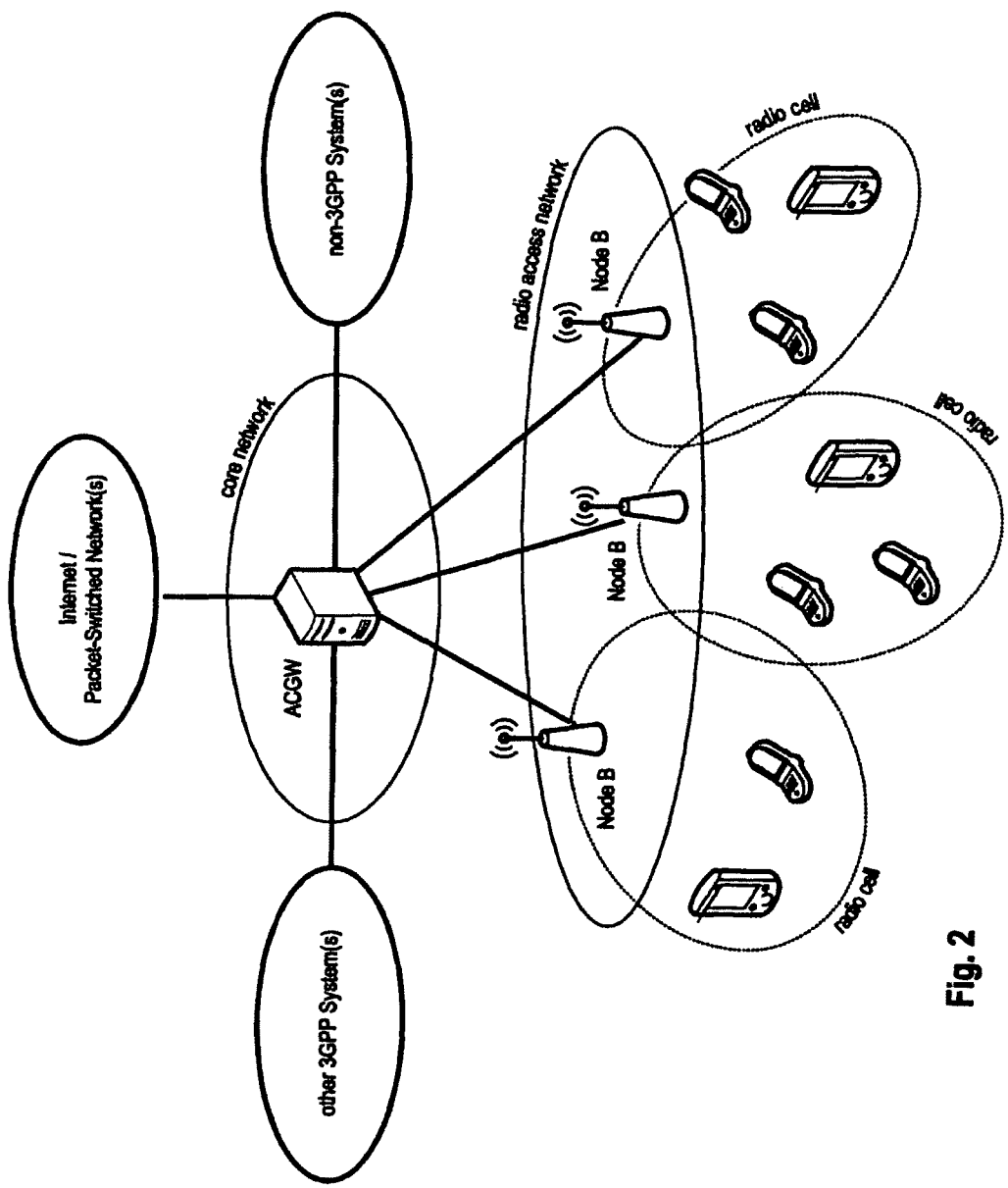

Another exemplary network architecture is shown in FIG. 2. The mobile communication system according to the exemplary embodiment shown in FIG. 2 is a "two node architecture" consisting of Access and Core Gateways (ACGW) and Node Bs. In comparison to the network architecture shown in FIG. 1, the ACGW will handle CN functions, i.e. routing calls and data connections to external networks, and also implements RAN functions. Thus, the ACGW may be considered as to combine functions performed by GGSN and SGSN in today's 3G networks and RAN functions as for example radio resource control (RRC), header compression, ciphering/integrity protection and outer ARQ. The Node Bs may handle functions as for example segmentation/concatenation, scheduling and allocation of resources, multiplexing and physical layer functions.

The control plane (CP) and user plane (UP) known from today's 3G networks may be terminated in the ACGW, which would enable support of seamless network controlled mobility without the need for interfaces between the Node Bs. Both 3GPP and Non-3GPP integration may be handled via the ACGW's the interface to the external packet data networks (e.g. internet).

As already indicated above, in the exemplary network architecture of FIG. 2, it is assumed that the ownership of the cell resources is handled in each Node B. Having the cell resource ownership outside the ACGW makes it possible to support pooling of ACGW (of both CP/UP flows), allowing one Node B to be connected to several ACGWs for different terminals (thus avoiding a single point of failure).

Although not directly shown in FIG. 1 it is also possible to support an inter-ACGW interface for the case of ACGW belonging to different pools.

Next, different embodiments of the invention will be described in more detail. It is to be noted that in FIG. 6 through FIG. 10, a base station (Node B) is assumed to be the network entity in the mobile communication system responsible for resource allocation for exemplary purposes. The function within a network entity in the mobile communication system responsible for resource allocation for planning and allocating resources to the mobile terminals is also referred to as the scheduler.

Figure 6:
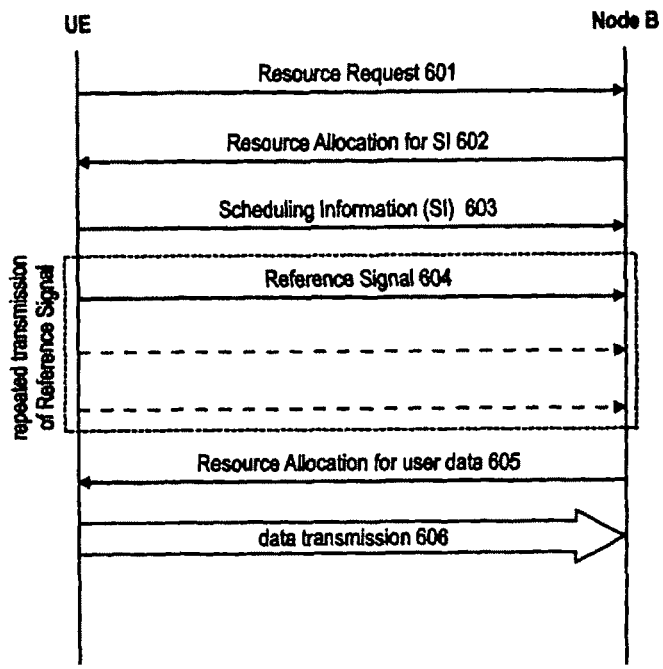

FIG. 6 illustrates a resource allocation procedure according to one exemplary embodiment of the invention. The main characteristics of proposed scheduling procedure is that only a small resource request message is transmitted as contention-based data and secondly that channel-dependent scheduling is efficiently supported by the scheduling procedure.

In the first step, a mobile terminal (UE) sends 601 a resource request to the base station (Node B) in order to request the allocation of uplink resources for the transmission of data. For example, the mobile terminal will typically send this message when user data arrives in a transmission buffer at the mobile terminal. In FIG. 6, it is assumed that the mobile terminal hasn't been allocated any resources yet, so that no scheduled resources have been allocated to the mobile station. The resource request message is transmitted on a contention-based channel. For example, but not limited thereto, the resource request is a Layer-1 or Layer 2 message.

In order to keep the amount resources reserved for the contention-based access channel low, only a short message should be transmitted in a contention-based manner. Therefore, according to one exemplary implementation, the resource request could consist of a flag only, which indicates to the base station that the requesting mobile station wishes to transmit data on the uplink. If it should be necessary to identify the requesting mobile terminal, a user-specific scrambling of the rate request message could be used. The user-specific scrambling of the resource request thus provides an implicit identification of the mobile terminal.

Alternatively, instead of a one-bit flag, the resource request message in another exemplary implementation consists of a temporary or static identifier, e.g. C-RNTI (cell radio network temporary identity) or IMSI respectively, of the requesting mobile terminal. In this case, the identifier would on the one hand indicate that the mobile terminal wishes to send data on uplink and simultaneously explicitly identifies the mobile terminal. This option would however consume more bits compared to the single-bit flag solution proposed above.

In a further optional variation, the resource request may further include information allowing the base station to prioritize resource requests from several users. For example, this additional information in the resource request may be information on the urgency of the request. This information on the urgency of the request may for example be communicated in form of QoS information of the user data the mobile terminal intends to transmit, e.g. the priority of the data.

One possible advantage that may be achieved by providing only a limited amount of information in the resource request message is to minimize collisions on the content-based channel via which the resource request is transmitted.

In the exemplary resource allocation procedure shown in FIG. 6 it may be assumed that the resource request only consists of information indicating that the mobile terminal intends to transmit user data on the uplink. Upon reception of the resource request at the base station, the base station issues and transmits 602 a resource allocation message to the mobile terminal.

This first resource allocation message may grant resources to the mobile terminal for transmitting more detailed information on the user data it intends to send. For example, this first resource allocation message may grant the mobile terminal scheduled resources for providing more detailed information to the base station. For simplicity this more detailed information will be referred to as scheduling information (SI) in the following. The first resource allocation message (or grant message) may indicate to mobile terminal what resources (e.g. time/frequency symbols) should be utilized on the uplink for transmitting the scheduling information.

In a variation of this embodiment, the grant message may optionally also indicate the frequency band/spectrum for the transmission of a reference signal, such as a pilot signal, from the mobile station of the base station. The reference signal may be for example used by the base station for uplink channel estimation (facilitating uplink coherent demodulation/detection of data such as the scheduling information) and also for uplink channel/quality estimation (facilitating channel-dependent scheduling). The reference signal may or may not occupy at least a partly different spectrum than the spectrum used for transmission of scheduling information. In case the reference signal occupies partly different spectrum, the base station may also perform channel-quality estimation for other frequencies than that used for transmitting the scheduling information and, as a consequence, allows for uplink channel-dependent scheduling.

In the next step, upon having received the first resource allocation message, the mobile terminal transmits 603 scheduling information on the allocated scheduled resources. The scheduling information may for example contain very detailed information on the mobile terminal status, such as for example buffer status per flow, QoS information per flow and also the mobile terminal's power status. A flow could be for example logical channel or priority queue. Since the scheduling information is transmitted as scheduled data via a scheduled shared channel, no collision with other data from other mobile terminals will occur.

In addition to the transmission of scheduling information, the mobile terminal may also transmit a reference signal to the base station. The reference signal may be for example transmitted on preconfigured or known uplink resources or the resources may alternatively configured by the base station using the resource allocation message in step 602 or other control signaling. In theory, one transmission of the reference signal would be sufficient. Since the channel may change significantly for one user within the time instance of sending the reference signal and the actual resource allocation for this user by the base station, the information on the uplink channel at the base station may not be up-to-date at the time of making the resource allocation for the requesting user. Therefore, the mobile station may transmit 604 the reference signal repeatedly until a resource allocation message for the user data is received (see step 605 described below). This would enable the base station to have up-to-date channel status knowledge at the time of deciding on the uplink resources to be allocated to the mobile terminal.

Based on the received scheduling information and the channel quality measured by the base station on basis of the reference signal(s), the base station can make the resource allocation for user data transmission. Upon having decided on the resource allocation, the base station transmits 605 a second resource allocation message to the mobile terminal. This second resource allocation message indicates to the mobile terminal the resources on the uplink to be used for user data transmission. Upon having received this second resources allocation message, the mobile terminal may start transmitting 606 the user data on the allocated resources via the scheduled shared channel.

The exemplary resource allocation procedure described with respect to FIG. 6 above may have several advantageous. For example, the reduction of the size of the resource request transmitted on a contention-based channel may reduce the probability of collision with other data transmitted by other mobile terminals via the contention-based channel. Further, by granting resources for transmitting scheduling information to the mobile terminal, the potentially long and thus collision-prone scheduling information can be transmitted via scheduled resources, so that no collision with other data from different users may occur. If repeatedly transmitting the reference signal until reception of the second resource allocation message, the base station may base its resource allocation on more accurate channel estimations.

Next, another exemplary embodiment of a resource allocation procedure will be described with reference to FIG. 7. The mobile terminal first sends 701 a resource request to the base station. The resource request may comprise a flag or a mobile terminal identifier, as described above with reference to FIG. 6, and may additionally include uplink resource information. The purpose of the uplink resource information is to signal the category of user data to be transmitted by the mobile terminal to the base station.

For example, the uplink resource information in the resource request may indicate to that base station that the mobile station intends to transmit data of a delay-sensitive and/or low data rate service, such as VoIP (Voice over IP) or a signaling radio bearer (SRB). When transmitting delay-sensitive and/or low data rate service data, it is desirable to have a fast allocation of resources in order to meet the delay requirements.

Depending on the load situation in the radio cell the mobile terminal is located in and based on uplink resource information provided by mobile terminal, the base station may allocate 702 resources for uplink user data transmission immediately in response to the resource request or not.

In case the uplink resource information indicate to the base station that data of a predetermined category is to be transmitted by the mobile terminal (for example data of a delay-sensitive and/or low data rate service), the base station may allocate 702 resources for transmitting the user data and returns 703 a resource allocation message to the mobile terminal granting resources for the transmission 704 of the user data.

This exemplary operation would allow for reducing the overall delay of the scheduling procedure significantly. Especially delay critical and/or low data rate services like VoIP may benefit from this delay reduction. Since for an application such as VoIP the rate request may need to be transmitted for every voice packet, e.g. every 20 ms (depending on the resource allocation by the base station), the uplink traffic load could be also decreased significantly in comparison to the procedure outlined with respect to FIG. 6, if the VoIP packet can be transmitted directly after having received the first resource allocation message from the base station, i.e. without having to send scheduling information to the base station first. Furthermore, the gain of channel-dependent scheduling may not be that significant for such low data-rate service.

In general, there are several options to indicate the uplink resource information. One option is to signal the corresponding flow ID, e.g. logical channel ID or queue ID of the data to be transmitted. Based on this flow ID base station may identify the service category for which the mobile station requests resources, e.g. VoIP or a signaling radio bearer, and may use this information for granting resources immediately. In case data of several flows is to be transmitted, the flow ID may indicate the flow having the highest priority or QoS requirements. Alternatively, the mobile station may indicate the amount of required uplink resources in a predefined set of data sizes, e.g. number of bits. This predefined set would for example contain the most common sizes for delay sensitive and low bit rate services. Another and possibly the simplest option may be that the uplink resource information is a one-bit flag in the resource request indicating that the mobile station has delay-critical data pending for transmission. Certain rules may for example be defined, in which cases the mobile terminal is allowed to set this flag.

Figure 7:
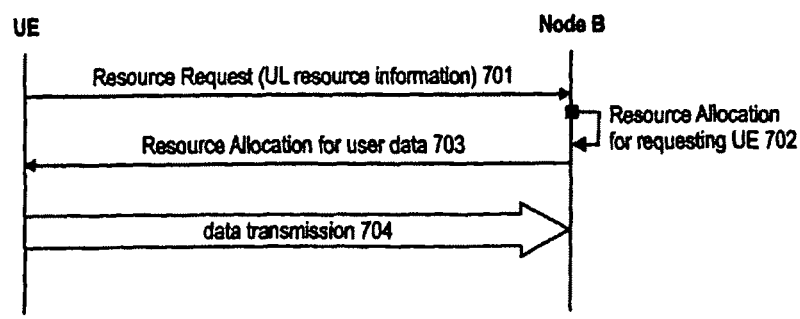

FIG. 7 illustrates the case, where the mobile terminal indicates that it has to send user data of a delay sensitive and/or low bit rate service which results in the base station already indicating the allocated resources in the first resource allocation method sent.

In case the mobile terminal indicates in the resource request that it does not have to send data of a delay sensitive and/or low bit rate service, the resource allocation may continue with steps 602 to 606 as outlined with reference to FIG. 6. For example, upon detection at the base station that resources are not requested for a delay sensitive and/or high bit rate service, the base station may only grant resources for transmitting scheduling information to the mobile station as outlined and may proceed with the steps illustrated in FIG. 6.

In another embodiment of the invention, the resource allocation procedure as illustrated in FIG. 6 is modified as will be described next. According to this embodiment, the resource request sent 601 by the mobile terminal may additionally include uplink resource information as described with respect to FIG. 7. The base station will determine whether the mobile terminal requests resources for user data of a category that requires immediate allocation of resources (e.g. data of delay sensitive and/or low bit rate service as outlined above). If this is the case the base station allocates resources for the transmission of the data for which the request has been received and indicates the allocated resources within the first resource allocation message sent 602 in addition to the resources allocated for transmitting the scheduling information.

The data for which the mobile terminal has requested resources may thus already be transmitted by the mobile station in the same transmission with the scheduling information, so that the delay is minimized. Based on the scheduling information and the transmitted 604 reference signal(s) the base station may reevaluate its previous resource allocation and may update the resource allocation in the resource allocation message of step 605.

Alternatively, the base station may assign default resources to the mobile terminal for the transmission of the user data when sending the resource allocation in response to the resource request and may determine the appropriate resources based on the scheduling information and reference signal measurements later, so as to allocate the appropriate amount of uplink resources in step 605.

Figure 8:
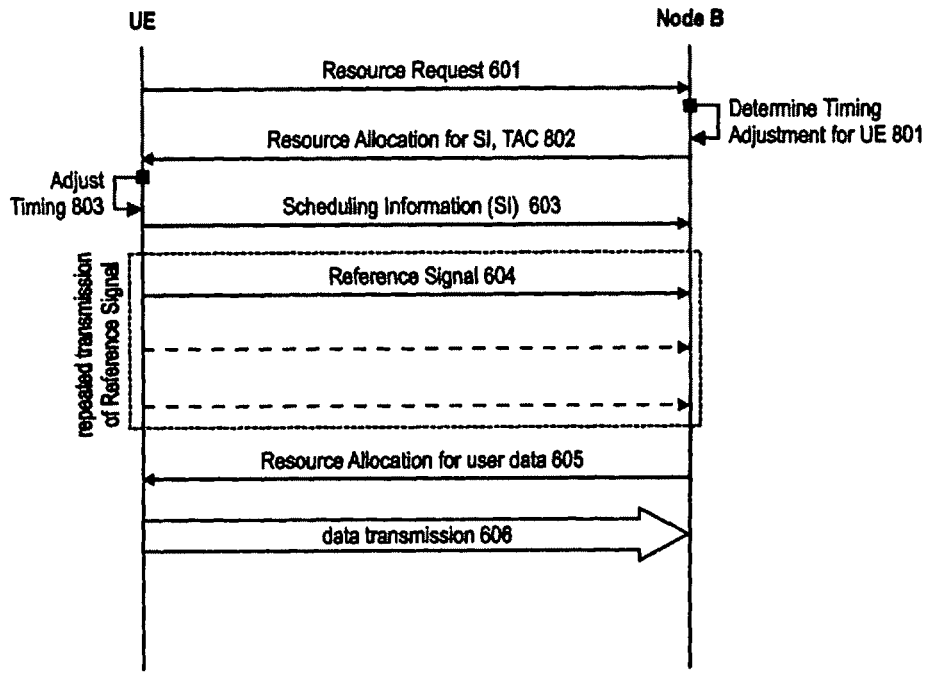

Next another embodiment of the invention will be described with reference to FIG. 8. FIG. 8 shows another exemplary resource allocation procedure according to an embodiment of the invention. Especially for single carrier FDMA systems, orthogonality in the uplink should be ensured within the order of a cyclic prefix. This may be implemented by the base station measuring the timing accuracy of a received signal and, based on the timing accuracy, determining and transmitting a timing adjustment command to the UE. In case a user/mobile terminal does not have uplink data to transmit for a longer period (e.g. a predetermined time span), the uplink time alignment may be lost. In this case, the mobile station needs to obtain time synchronization with the network through physical layer synchronization before transmitting data on the uplink in conventional systems.

Instead of performing the synchronization procedure, according to this embodiment of the invention, the base station could also use the received resource request message to control the timing accuracy of uplink transmissions of a particular user. After having received 601 the resource request from the mobile terminal, the base station may determine 801 the timing accuracy of the mobile terminal based on the received resource request message and may issue a timing adjustment command (TAC) to this mobile. For example, the TAC may be transmitted 802 as a separate control message or can be combined with the resource allocation message sent 802 by the base station.

Upon reception of the TAC at the mobile terminal, same may adjust 803 its uplink timing based on the command and may finish the resource allocation procedure with the adjusted uplink timing. It should be noted that for exemplary purposes only, FIG. 8 finishes the resource allocation procedure by performing steps 603 to 606 as described above. Based on whether the resource request transmitted in step 601 comprises uplink resource information, the base station may grant resources for user data transmission in the resource allocation message or for user data transmission and the transmission of scheduling information as has been outlined above with reference to FIG. 6 and FIG. 7.

Figure 9:
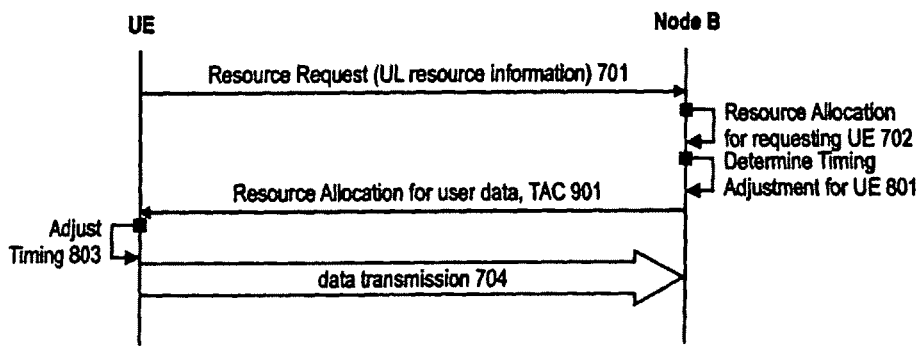

In this respect FIG. 9 illustrates another exemplary resource allocation procedure according to another embodiment of the invention. In this embodiment, the procedure described with respect to FIG. 7 above is further improved in that the base station determines 801 the TAC and communicates 901 the TAC to the requesting mobile terminal. As indicated above when discussing FIG. 8, the mobile terminal may use the TAC command to adjust 803 its uplink timing prior to the next transmission on the uplink.

The TAC command may be either signaled 901 in a separate control message or may be included in the resource allocation message transmitted by the base station in response to the resource request. In this exemplary embodiment of the invention, the resource allocation message comprises the TAC command and information on the resources allocated 702 to the mobile terminal by the base station in response to uplink resource information comprised in the resource request message. Optionally, the resource allocation message may further comprise information granting resources for the transmission of scheduling information and/or a reference signal to the base station.

In the embodiments described with respect to FIG. 8 and FIG. 9 above, the TAC may for example include binary timing-control commands implying to forward or backward the transmission timing a certain step size (e.g. x μs) transmitted with a certain period (e.g. y μs). Another option would be to include multi-step timing-control commands (for example changing the transmission timing by multiple steps of a given size) being transmitted on the downlink on a per-need basis.

When transmitting data on a contention-based access channel, there is a risk of collisions with other mobile terminals trying to access the channel simultaneously. In order to keep the collision probability sufficiently low, the message size transmitted as contention-based data should be small as already outlined before. However there could still be situations where several users are transmitting on the resource allocated for random access at the same time. In this case intra-cell interference would be generated. The received SNR (Signal-to-Noise Ratio) of one user needs to be sufficiently high sin order to allow the base station to detect and decode the transmitted data correctly. Therefore, a mechanism may be advantageous that ensures that a high priority resource request message is correctly received even in case of intra-cell interference due to collisions.

Figure 5:
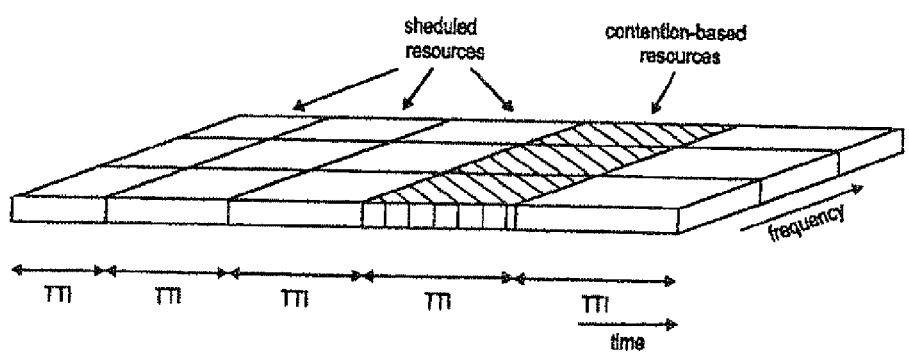
FIG. 5 to 10 show different exemplary embodiments of a resource allocation procedure according to different embodiments of the invention.

According to a further embodiment of the invention the network may reserve resources, e.g. frequency spectrum, for the contention-based access as already illustrated in FIG. 5. In order to benefit from frequency diversity, the resources for contention-based access may be allocated in a distributed manner, i.e. a "comp-shaped" spectrum may be allocated. In order to prioritize resource request messages sent as contention-based data, high priority resource requests (i.e. resource requests for the transmission of data having a priority above a given threshold priority level) may use the whole allocated spectrum for contention-based access, i.e. all combs in a distributed spectrum, whereas resource request of small priority (i.e. resource requests for the transmission of data having a priority below or equal to a given threshold priority level) may only use part of the allocated spectrum, i.e. only a subset of the "combs" in the spectrum. For example, the bandwidth used for transmitting the resource request, i.e. the number of "combs" in the spectrum, may be proportional to the priority of the user data for which resources are requested.

Another option would be to group the priority levels into priority groups and to have the mobile station to decide the number of "combs" to use for the transmission of the resource request based on the priority group. The priority that may be utilized for determining the uplink bandwidth to use for transmitting the resource request may for example correspond to an average or the highest priority of logical channel(s) of which the mobile station intends to transmit user data, the QoS requirements for the user data to be transmitted (for example delay requirements, data rate, nature of the data— e.g. emergency calls may have highest priority while background services have low priority), etc.

When prioritizing resource request messages as described above, the received SNR of high priority resource requests may be improved and the high priority resource requests may be correctly detected and decoded even in case of collision.

In a variation of this embodiment, the configuration of the usable bandwidth for contention-based access could be for example signaled by the network, e.g. using control signaling such as RRC signaling. High class mobile terminals may for example be allowed to use the full allocated contention-based access spectrum. Alternatively the priority of the highest priority logical channel may be used to determine the portion of the available spectrum a user may use for contention-based access.

In another variation this mechanism for prioritizing the contention-based access transmission is also beneficial for the initial access when mobile terminals do not have a cell specific identity for communication in a cell yet. Considering for exemplary purposes the LTE of UMTS, these situations would occur e.g. when transiting from LTE_DETACHED state to LTE_ACTIVE state or from LTE_IDLE state to LTE-_ACTIVE state.

Figure 10:
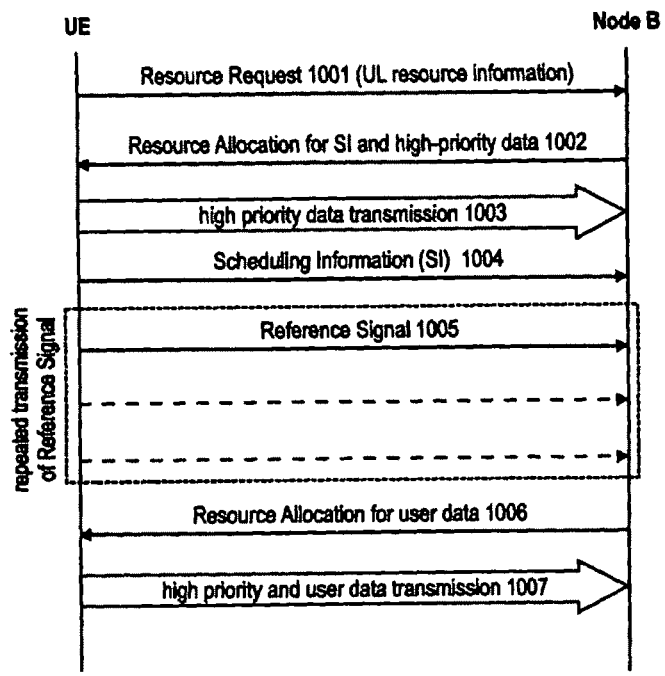

As indicated in FIG. 6, FIG. 8 and FIG. 10, the mobile terminal may repeatedly send reference signals, e.g. pilots, to the base station until it receives a resource allocation message granting resource for uplink user data transmission. By using the repeatedly transmitted reference signals the base station may be aware of up-to-date channel state information allowing for efficient channel-dependent scheduling. Generally the repeatedly transmission of reference signals is not limit to a specific scheduling procedure, but should be seen as rather independent feature. Repeatedly transmission of reference signals may be advantageous in any uplink scheduling scheme which supports channel-dependent scheduling.

According to a further embodiment of the invention the frequency of the reference signal transmission could be either network or mobile station controlled. In the first option the network would be in control of the reference signal transmission frequency of a user for example by signaling the periodicity of the reference signal transmission to the mobile, e.g. by control signaling (for example RRC signaling). This option may enable the access network to control the uplink load due to the reference signal transmissions of all users in cell.

In the second option, the mobile station may determine how often it transmits the reference signal. This decision may for example consider the transmission power constraints of the mobile terminal or the variation of the channel. A static or low-speed mobile terminal may for example transmit reference signals less frequent than a mobile terminal moving fast (e.g. in a vehicle or train), since the channel status doesn't change significantly over time.

In another embodiment of the invention, the mobile terminal may request uplink resources for transmitting different user data (for example user data of different categories, logical channels, etc.). The resource allocation procedure according to this embodiment will be described with reference to FIG. 10. In the procedure illustrated in FIG. 10, it is assumed for exemplary purposes that two different user data is to be transmitted, user data of a high-priority service A and user data of a low-priority service B. In the resource request message transmitted 1001 by the mobile station to the base station, there is included uplink resource information that indicates the category of the user data. The purpose of the uplink resource information is to signal to the base station the categories of user data to be transmitted by the mobile terminal so as to allow the base station to appropriately schedule the transmission.

The base station determines that the user data of service A are of a category requiring minimizing the delay for its transmission and/or of a low data rate. Therefore, the base station decides to already grant resources to the mobile terminal for the transmission of this high-priority user data. For the user data of service B, the base station decides not the immediately assign resources, but to schedule only resources for the transmission of scheduling information relating to the user data of service B. Optionally, in addition to the resource allocation for user data of service A the base station may also allocate sufficient resources so that scheduling information may also be transmitted for the user data of service A.

Upon having determined the resources, the base station transmits 1002 a resource allocation message to the mobile station. This resource allocation message may grant the mobile terminal resources for the transmission of the user data of service A, the scheduling information for user data of service B and—optionally—for user data of service A.

The mobile station may next transmit 1003 the user data of service A and may provide 1004 scheduling information for the user data of service B (and for service A) to the base station. Further, the mobile station transmits 1005 reference signal(s) to the base station. Advantageously, the reference signal may be transmitted repeatedly by the mobile station.

It should be noted that the resource allocation message transmitted by the base station may also include a grant of resources for the transmission of the reference signal as has been outlined with reference to FIG. 6 above. The resources on which the reference signal is to be transmitted should be chosen, i.e. cover a bandwidth of the spectrum, to allow the base station an accurate estimation of the channel for both the resources to be used for transmitting the user data of service A and B.

Based on the scheduling information and based on the channel estimate, the base station may determine the resources to be utilized for the transmission of user data of service B and may optionally reevaluate the resource assignment for the user data of service A. The resource allocation for the transmission of the user data of service B and optionally an update of the resources allocated for the transmission of the user data of service A is then communicated 1006 to the mobile terminal in another resource allocation message.

Upon having received this second resource allocation message, the mobile terminal may transmit 1007 user data of service A and service B to the base station.

Another embodiment of the invention relates to the implementation of the above described various embodiments using hardware and software. It is recognized that the various embodiments of the invention above may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The invention claimed is:

1. A method for requesting resources for transmitting data on uplink within a mobile communication system utilizing an uplink scheme comprising transmissions on a scheduled shared channel and a contention-based channel, the method being performed by a mobile terminal and comprising:
    transmitting a resource request to a network entity responsible for resource allocation via the contention-based channel,
    receiving, in response to the resource request, a resource allocation message granting resources for transmitting data via the scheduled shared channel, and
    receiving a trigger for repeatedly transmitting a reference signal to the network entity and information indicating a frequency bandwidth used for repeatedly transmitting the reference signal, the reference signal being a signal used for uplink channel estimation.

2. The method according to claim 1, wherein the resource allocation message received in response to the resource request indicates resources granted to the mobile terminal for transmitting the reference signal.

3. The method according to claim 1, wherein the mobile terminal utilizes the resources granted for the scheduled shared channel as indicated in the resource allocation message received in response to the resource request for repeatedly transmitting the reference signal.

4. The method according to claim 3, wherein the resource allocation message received in response to the resource request indicates resources granted to the mobile terminal for repeatedly transmitting the reference signal and the mobile terminal utilizes the resources granted for repeatedly transmitting the reference signal to repeatedly transmit the reference signal.

5. The method according to claim 3, wherein a frequency of the transmission of the reference signal is configured by control signaling received from a radio access network of the mobile communication system, or is controlled by the mobile terminal.

6. The method according to claim 3, wherein the mobile terminal stops transmitting the reference signal upon having received a second resource allocation message granting resources to the mobile terminal for transmitting user data on the scheduled shared channel in response to a transmission of the scheduling information.

7. The method according to claim 1, wherein a single carrier Frequency Division Multiple Access (FDMA) scheme is used to transmit data on the uplink.

8. The method according to claim 1, wherein the contention-based channel is mapped to a distributed spectrum on the uplink scheme.

9. The method according to claim 1, wherein a bandwidth utilized for transmitting resource request on the uplink scheme is proportional to a priority of the data for which resources for transmission is requested.

10. The method according to claim 1, wherein a bandwidth the mobile terminal is configured to utilize for transmitting the resource request is configured by control signaling received from a radio access network of the mobile communication system.

11. The method according to claim 1, wherein the method further comprises determining a bandwidth to utilize for transmitting the resource request based on a priority of the data for which resource allocation is requested.

12. The method according to claim 1, wherein the resources for transmitting data on the scheduled shared channel are granted on a transmission time interval basis.

13. The method according to claim 12, wherein the resource allocation message indicates at least one transmission time interval or a number of transmission time intervals for which the resource allocation message grants resources.

14. The method according to claim 1, wherein the resource request transmitted by the mobile terminal does not comprise scheduling information.

15. The method according to claim 1, wherein the resource request comprises an implicit or explicit identification of the requesting mobile terminal.

16. The method according to claim 1, wherein the resource request comprises a flag indicating to the network entity responsible for resource allocation that the mobile terminal requests the allocation of resources for data transmission.

17. The method according to claim 16, wherein the method further comprises scrambling the resource request with a user-specific scrambling code prior to the transmission of the resource request.

18. The method according to claim 1, wherein the resource request comprises an identifier of the mobile terminal indicating to the network entity responsible for resource allocation that the mobile terminal requests the allocation of resources for data transmission.

19. The method according to claim 1, wherein the resource request comprises resource information indicating uplink resources required by the mobile terminal for transmitting user data.

20. The method according to claim 19, wherein the resource information comprises a flow identifier of a data flow through which the mobile terminal intends to transmit user data or a number of hits the mobile terminal intends to transmit.

21. The method according to claim 19, wherein the resource information consists of a flag indicating to the network entity responsible for resource allocation, when set, that the mobile terminal intends to transmit data of a delay-critical service.

22. The method according to claim 1, wherein the resource allocation message received in response to the resource request grants resources for transmitting the scheduling information to the network entity responsible for resource allocation and the method further comprises:
   transmitting, in response to the resource allocation message, the scheduling information to the network entity responsible for resource allocation via the scheduled shared channel, and
   receiving, in response to the transmitting of the scheduling information, a second resource allocation message granting resources to the mobile terminal for transmitting user data on the scheduled shared channel.

23. The method according to claim 1, further comprising receiving, in response to the resource request, a timing adjustment command from the network entity responsible for resource allocation, wherein the timing adjustment command is comprised in the resource allocation message received in response to the resource request.

24. The method according to claim 23, further comprising realigning uplink timing according to the timing adjustment command prior to transmitting of scheduling information via the scheduled shared channel.

25. The method according to claim 1, wherein the resource allocation message received in response to the resource request grants resources for transmitting data including user data via the scheduled shared channel.

26. The method according to claim 1, further comprising receiving information indicating a periodicity of the repeatedly transmitting reference signal.

27. A method for allocating resources to a mobile terminal for transmitting data on uplink within a mobile communication system utilizing an uplink scheme comprising transmissions on a scheduled shared channel and a contention-based channel, the method being performed by a network entity responsible for resource allocation of the mobile communication system and comprising:
   receiving a resource request from the mobile terminal via the contention-based channel,
   transmitting, in response to the resource request, a resource allocation message granting resources for transmitting data via the scheduled shared channel to the mobile terminal, and
   transmitting a trigger for repeatedly transmitting a reference signal to the network entity and information indicating a frequency bandwidth used for repeatedly transmitting the reference signal, the reference signal being a signal used for uplink channel estimation.

28. The method according to claim 27, wherein the resource allocation message transmitted in response to the resource request indicates resources granted to the mobile terminal for transmitting the reference signal.

29. The method according to claim 27, further comprising repeatedly receiving the reference signal from the mobile terminal.

30. The method according to claim 27, wherein a single carrier Frequency Division Multiple Access (FDMA) scheme is used to transmit data on the uplink.

31. The method according to claim 30, wherein the contention-based channel is mapped to a distributed spectrum on the uplink scheme.

32. The method according to claim 27, wherein the network entity responsible for resource allocation grants the resources for transmitting data on the scheduled shared channel on a transmission time interval basis.

33. The method according to claim 32, wherein the resource allocation message indicates at least one transmission time interval or a number of transmission time intervals for which the resource allocation message grants resources.

34. The method according to claim 27, wherein the resource allocation message transmitted in response to the resource request grants resources for transmitting the scheduling information to the network entity responsible for resource allocation and the method further comprises:
receiving the scheduling information from the mobile station via the scheduled shared channel, and
transmitting, in response to the reception of the scheduling information, a second resource allocation message granting resources to the mobile terminal for transmitting user data on the scheduled shared channel to the network entity responsible for resource allocation.

35. The method according to claim 27, further comprising transmitting, in response to the resource request, a timing adjustment command to the mobile terminal, wherein the timing adjustment command is comprised in the resource allocation message transmitted to the mobile terminal in response to the resource request.

36. The method according to claim 35, wherein the timing adjustment command is configured to cause the mobile terminal to realign uplink timing prior to the mobile terminal transmitting of scheduling information via the scheduled shared channel.

37. The method according to claim 27, wherein the resource allocation message transmitted in response to the resource request grants resources to the mobil terminal for transmitting data including user data via the scheduled shared channel.

38. The method according to claim 27, further comprising transmitting information indicating a periodicity of repeatedly transmitting the reference signal by the mobile terminal.

39. A mobile terminal for use in a mobile communication system utilizing an uplink scheme comprising transmissions on a scheduled shared channel and a contention-based channel, the mobile terminal comprising:
a transmitter configured to transmit a resource request to a network entity responsible for resource allocation via the contention-based channel, and a receiver configured to receive, in response to the resource request, a resource allocation message granting resources for transmitting data via the scheduled shared channel, wherein
the receiver is further configured to receive a trigger for repeatedly transmitting a reference signal to the network entity and information indicating a frequency bandwidth used for repeatedly transmitting the reference signal, the reference signal being a signal used for uplink channel estimation.

40. The mobile terminal according to claim 39, wherein:
the resource allocation message received in response to the resource request grants resources for transmitting the scheduling information to the network entity responsible for resource allocation,
the transmitter is configured to transmit, in response to the resource allocation message, the scheduling information to the network entity responsible for resource allocation via the scheduled shared channel, and
the receiver is configured to receive, in response to the transmission of the scheduling information, a second resource allocation message granting resources to the mobile terminal for transmitting user data on the scheduled shared channel.

41. The mobile terminal according to claim 39, the receiver is further configured to receive, in response to the resource request, a timing adjustment command from the network entity responsible for resource allocation, wherein the timing adjustment command is comprised in the resource allocation message received in response to the resource request.

42. The mobile terminal according to claim 41, wherein the mobile terminal is further configured to realign uplink timing according to the timing adjustment command prior to transmitting of scheduling information via the scheduled shared channel.

43. The mobile terminal according to claim 39, wherein the resource allocation message received in response to the resource request grants resources for transmitting data including user data via the scheduled shared channel.

44. A network entity responsible for resource allocation for use in a mobile communication system utilizing an uplink scheme comprising transmissions on a scheduled shared channel and a contention-based channel, the network entity responsible for resource allocation comprising:
a receiver configured to receive a resource request from a mobile terminal via the contention-based channel, and
a transmitter configured to transmit, in response to the resource request, a resource allocation message granting resources for transmitting data via the scheduled shared channel to the mobile terminal, wherein
the transmitter is further configured to transmit, a trigger for repeatedly transmitting a reference signal to the network entity and information indicating a frequency bandwidth used for repeatedly transmitting the reference signal, the reference signal being a signal used for uplink channel estimation.

45. The network entity responsible for resource allocation according to claim 44, wherein:
the resource allocation message received in response to the resource request grants resources for transmitting the scheduling information to the network entity responsible for resource allocation,
the receiver is configured to receive the scheduling information from the mobile station via the scheduled shared channel, and
the transmitter is configured to transmit, in response to the reception of the scheduling information, a second resource allocation message granting resources to the mobile terminal for transmitting user data on the scheduled shared channel to the network entity responsible for resource allocation.

46. The method according to claim 44, wherein the transmitter is further configured to transmit, in response to the resource request, a timing adjustment command to the mobile terminal, wherein the timing adjustment command is comprised in the resource allocation message transmitted to the mobile terminal in response to the resource request.

47. The network entity responsible for resource allocation according to claim 46, wherein the timing adjustment command is configured to cause the mobile terminal to realign uplink timing prior to the mobile terminal transmitting of scheduling information via the scheduled shared channel.

48. The network entity responsible for resource allocation according to claim 44, wherein the resource allocation message transmitted in response to the resource request grants resources to the mobile terminal for transmitting data including user dat via the scheduled shared channel.

49. A non-transitory computer-readable medium storing instructions that, when executed by a processor of a mobile terminal, cause the mobile terminal to request resources for transmitting data on uplink within a mobile communication system utilizing an uplink scheme comprising transmissions on a scheduled shared channel and a contention-based channel, by:
   transmitting a resource request to a network entity responsible for resource allocation via the contention-based channel,
   receiving, in response to the resource request, a resource allocation message granting resources for transmitting data via the scheduled shared channel, and
   receiving a trigger for repeatedly transmitting a reference signal to the network entity and information indicating a frequency bandwidth used for repeatedly transmitting the reference signal, the reference signal being a signal used for uplink channel estimation.

50. The non-transitory computer-readable medium according to claim 49, wherein the resource allocation message received in response to the resource request grants resources for transmitting the scheduling information to the network entity responsible for resource allocation and wherein the computer-readable medium further stores instructions that, when executed by the processor of the mobile terminal, cause the mobile terminal to:
   transmit, in response to the resource allocation message, the scheduling information to the network entity responsible for resource allocation via the scheduled shared channel, and
   receive, in response to the transmission of the scheduling information, a second resource allocation message granting resources to the mobile terminal for transmitting user data on the scheduled shared channel.

51. The non-transitory computer-readable medium according to claim 49, wherein the mobile terminal is further caused to receive, in response to the resource request, a timing adjustment command from the network entity responsible for resource allocation, wherein the timing adjustment command is comprised in the resource allocation message received in response to the resource request.

52. A non-transitory computer-readable medium storing instructions that, when executed by a processor of a network entity responsible for resource allocation, cause the network entity responsible for resource allocation to allocate resources to a mobile terminal for transmitting data on uplink within a mobile communication system utilizing an uplink scheme comprising transmissions on a scheduled shared channel and a contention-based channel, by:
   receiving a resource request from the mobile terminal via the contention-based channel,
   transmitting, in response to the resource request, a resource allocation message granting resources for transmitting data via the scheduled shared channel to the mobile terminal, and
   transmitting a trigger for repeatedly transmitting a reference signal to the network entity and information indicating a frequency bandwidth used for repeatedly transmitting the reference signal, the reference signal being a signal used for uplink channel estimation.

53. The non-transitory computer-readable medium according to claim 52, wherein the resource allocation message received in response to the resource request grants resources for transmitting the scheduling information to the network entity responsible for resource allocation and wherein the computer-readable medium further stores instructions that, when executed by the processor of the network entity responsible for resource allocation, cause the network entity responsible for resource allocation to:
   receive the scheduling information from the mobile station via the scheduled shared channel, and
   transmit, in response to the reception of the scheduling information, a second resource allocation message granting resources to the mobile terminal for transmitting user data on the scheduled shared channel to the network entity responsible for resource allocation.

54. The non-transitory computer-readable medium according to claim 52, wherein the network entity responsible for resource allocation is further caused to transmit, in response to the resource request, a timing adjustment command to the mobile terminal, wherein the timing adjustment command is comprised in the resource allocation message received in response to the resource request.

* * * * *